United States Patent [19]

Nakamura et al.

[11] Patent Number: 5,298,542
[45] Date of Patent: Mar. 29, 1994

[54] ACRYLIC ESTER COPOLYMER PLASTISOL COMPOSITION

[75] Inventors: Eitaro Nakamura, Tokyo; Toshio Nagase, Tsukuba; Akira Nakayama, Yokosuka; Yutaka Kagoshima; Atsushi Tsukamoto, both of Yokohama, all of Japan

[73] Assignee: Nippon Zeon Co., Ltd., Japan

[21] Appl. No.: 981,724

[22] Filed: Nov. 25, 1992

[30] Foreign Application Priority Data

Nov. 27, 1991 [JP] Japan .................. 3-337760

[51] Int. Cl.$^5$ .......................... C08K 5/12; C08K 5/11
[52] U.S. Cl. .................... 524/297; 524/296; 524/298; 524/315; 525/902; 523/201
[58] Field of Search ......... 524/296, 297, 298, 306, 524/315; 523/201; 525/902

[56] References Cited

U.S. PATENT DOCUMENTS

| | | | |
|---|---|---|---|
| 4,210,467 | 7/1980 | Klatzer et al. | 148/519 |
| 4,613,650 | 9/1986 | Sekiya et al. | 524/828 |
| 4,957,955 | 9/1990 | Saur et al. | 524/314 |

FOREIGN PATENT DOCUMENTS

| | | |
|---|---|---|
| 3713462 | 11/1988 | Fed. Rep. of Germany . |
| 0035420 | 6/1980 | Japan . |
| 0095248 | 1/1988 | Japan . |

OTHER PUBLICATIONS

Derwent Publications Ltd., Abstract No.: 779558/43.
Derwent Publications Ltd., Abstract No.: 88-114473/17.
Derwent Publications Ltd., Abstract No.: 92-387827.

Primary Examiner—Paul R. Michl
Assistant Examiner—Peter Szekely
Attorney, Agent, or Firm—Millen, White, Zelano, & Branigan

[57] ABSTRACT

An acrylic ester copolymer plastisol composition comprises (A) copolymer particles comprising, as the major components thereof, (a) 98 to 50 weight % of an alkyl acrylate unit having an alkyl group of 1 to 8 carbon atoms and/or an alkyl methacrylate unit having an alkyl group of 1 to 8 carbon atoms and (b) 2 to 50 weight % of a diene monomer unit, (B) a plasticizer and, optionally, (C) a vulcanizing agent. Another acrylic ester copolymer plastisol composition comprises (A) copolymer particles comprising an ionic crosslinked copolymer prepared by ionic crosslinking of a copolymer comprising, as the major components thereof, (a) 97 to 50 weight % of an alkyl acrylate unit having an alkyl group of 1 to 8 carbon atoms and/or an alkyl methacrylate unit having an alkyl group of 1 to 8 carbon atoms, (b) 2 to 40 weight % of a diene monomer unit and (c) 1 to 20 weight % of a radical polymerizable unsaturated carboxylic acid unit of 3 to 8 carbon atoms having a carboxyl group and (B) a plasticizer. The ionic crosslinking is made through the carboxyl group in the copolymer by addition of a monovalent or divalent metal cation. The acrylic ester copolymer plastisol composition has excellent storage stability even when generally used inexpensive plasticizers are used, gives a molded sheet showing no bleeding and generates no toxic gas on heating to a high temperature, on burning or in case of fire.

18 Claims, No Drawings

ACRYLIC ESTER COPOLYMER PLASTISOL COMPOSITION

BACKGROUND OF THE INVENTION

1. Field of the Invention

The present invention relates to a novel acrylic ester copolymer plastisol composition. More particularly, the present invention relates to a novel acrylic ester copolymer plastisol composition having excellent storage stability even when generally used inexpensive plasticizers are used, giving a molded sheet showing no bleeding and generating no toxic gas on heating to a high temperature, on burning or in case of fire.

2. Description of the Prior Art

A plastisol is a viscous composition of a liquid or paste form which is prepared by homogeneously dispersing polymer particles having a specifically adjusted particle size (for example, an average size of primary particles of 0.05 to 2 $\mu$m) and a specifically adjusted particle size distribution in a liquid substance comprising a plasticizer as the major component and other components added according to necessity, such as diluents and liquid stabilizer, together with other powder materials utilized according to necessity, such as pigments, fillers, thixotropic agents, blowing agents, powder stabilizers and the like. As the polymer particles, particles of polyvinyl chloride, such as homopolymer of vinyl chloride, copolymer of vinyl chloride with vinyl acetate and the like, are generally utilized.

The polyvinyl chloride plastisols have excellent storage stability at room temperature for a long time and form a homogeneous gel by heating to give soft sheets and coated layers having high tensile strength with ease. They are widely utilized in the field of coating of steel plates, building materials, clothing materials, daily necessary goods, sundries, automobile parts and the like.

Polyvinyl chloride has good mechanical properties, handling, cold resistance, transparency, foaming property and flame retarding property and is inexpensive. However, it has a problem that hydrochloric acid is generated on heating to a high temperature, on burning or in case of fire and is not a desirable material from the point of view of safety, health and environmental protection.

For improving the problem, plastisols comprising a polymer of alkyl (meth)acrylate and an ester plasticizer as the essential components thereof have been proposed (Laid Open Japanese Patent Applications Showa 51-71344 and Showa 52-42590, which correspond to English Patent 1516510 and U.S. Pat. No. 4,071,653, respectively).

However, even though the homopolymers and copolymers of alkyl (meth)acrylates do not have the problem of polyvinyl chlorides described above, they have a problem that, when a plastisol is prepared by dispersing the polymer of alkyl (meth)acrylate in a general use plasticizer, such as di-2-ethylhexyl phthalate (DOP) which is generally utilized for polyvinyl chlorides, and a sheet is prepared by heat gelation of the plastisol, the sheet inevitably shows a large extent of bleeding when it is cooled to the room temperature. To avoid the problem of bleeding, an expensive plasticizer, such as tricresyl phosphate (TCP), butyl benzyl phthalate, acetyl tributyl citrate or the like, must be utilized for preparation of the sheet. These plasticizers have another problem in that they have high polarity and the polymers are swollen with the plasticizer to cause remarkable increase of viscosity of the plastisol during storage.

Compatibility of the polymers of alkyl (meth)acrylates with the general use ester plasticizers can be improved by using alkyl acrylates or alkyl methacrylates having a bulky alkyl group for copolymerization (Japanese Patent Publication Showa 62-3868 and U.S. Pat. No. 4,199,486). However, plastisols prepared according to this method have a problem that viscosity is remarkably increased during storage, leading occasionally to gelation at the room temperature and, therefore, they are not advantageous for practical use.

In general, the storage stability of plastisol tends to be improved by increasing the size of the dispersed particles. When the size of the dispersed particles is increased, the gelation property of the plastisol is generally decreased, leading to unfavorable properties, such as deteriorated appearance of heat molded sheets and decrease of mechanical strengths.

A plastisol having good storage stability of viscosity was disclosed which utilizes resin particles prepared by three stages: the first stage polymerization of forming particles of homopolymer or a copolymer of methyl methacrylate, the second stage polymerization of adding a polymerizable carboxylic acid to the polymer formed and the last stage of adding a salt-forming agent (Japanese Patent Publication Showa 55-35420. This plastisol has problems that multiple stages of polymerization are essential and production efficiency is decreased and that molded products show bleeding unless an expensive highly polar plasticizer such as TCP is utilized.

A copolymer of a micro particle form prepared by reaction of a copolymer comprising carboxyl group with a polyfunctional base substance was proposed as resin particles giving plastisol having good storage stability (Laid Open Japanese Patent Application Showa 63-95248 and Laid Open German Patent Application 3713462). This copolymer has a problem that the applicable plasticizers are limited to those having high polarity.

SUMMARY OF THE INVENTION

The present invention accordingly has an object to provide a plastisol composition having excellent storage stability even when generally used inexpensive plasticizers are used, giving a molded sheet showing no bleeding and generating no toxic gas on heating to a high temperature, on burning or in case of fire.

Extensive investigations undertaken by the present inventors with the object described above lead to a discovery that the object can be achieved by a plastisol composition comprising (A) copolymer particles comprising, as the major components thereof, alkyl (meth)acrylate units having an alkyl group of a number of carbon atoms in a specific range and diene monomer units in a specific ratio or copolymer particles comprising an ionic crosslinked copolymer prepared by ionic crosslinking of a copolymer comprising, as the major components thereof, alkyl (meth)acrylate units having an alkyl group of a number of carbon atoms in a specific range, diene monomer units and radical polymerizable unsaturated carboxylic acid units of number of carbon atoms in a specific range having a carboxyl group in a specific ratio, (B) a plasticizer and, optionally according to necessity, (C) a vulcanizing agent. The ionic crosslinking in the above is made through the carboxyl group in the copolymer by addition of a monovalent or divalent metal cation. The present invention has been completed on the basis of the discovery.

Thus, the acrylic ester copolymer plastisol composition of the present invention comprises (A) copolymer particles comprising, as the major components thereof, (a) 98 to 50 weight % of an alkyl acrylate unit having an alkyl group of 1 to 8 carbon atoms and/or an alkyl methacrylate unit having an alkyl group of 1 to 8 carbon atoms and (b) 2 to 50 weight % of a diene monomer unit, (B) a plasticizer and, optionally according to necessity, (C) a vulcanizing agent (Invention 1).

The acrylic ester copolymer plastisol composition of the present invention may also comprise (A) copolymer particles comprising an ionic crosslinked copolymer prepared by ionic crosslinking of a copolymer comprising, as the major components thereof, (a) 97 to 50 weight % of an alkyl acrylate unit having an alkyl group of 1 to 8 carbon atoms and/or an alkyl methacrylate unit having an alkyl group of 1 to 8 carbon atoms, (b) 2 to 40 weight % of a diene monomer unit and (c) 1 to 20 weight % of a radical polymerizable unsaturated carboxylic acid unit of 3 to 8 carbon atoms having a carboxyl group and (B) a plasticizer (Invention 2). The ionic crosslinking is made through the carboxyl group in the copolymer by addition of a monovalent or divalent metal cation.

Other and further objects, features and advantages of the invention will appear more fully from the following description.

DETAILED DESCRIPTION OF THE INVENTION

The invention is described in detail in the following.

Invention 1 of the present invention utilizes copolymer particles comprising, as the major components thereof, (a) 98 to 50 weight % of an alkyl acrylate unit having an alkyl group of 1 to 8 carbon atoms and/or an alkyl methacrylate unit having an alkyl group of 1 to 8 carbon atoms and (b) 2 to 50 weight % of a diene monomer unit as the plastisol resin particles.

Invention 2 of the present invention utilizes copolymer particles comprising an ionic crosslinked copolymer prepared by ionic crosslinking of a copolymer comprising, as the major components thereof, (a) 97 to 50 weight % of an alkyl acrylate unit having an alkyl group of 1 to 8 carbon atoms and/or an alkyl methacrylate unit having an alkyl group of 1 to 8 carbon atoms, (b) 2 to 40 weight % of a diene monomer unit and (c) 1 to 20 weight % of a radical polymerizable unsaturated carboxylic acid unit of 3 to 8 carbon atoms having a carboxyl group as the plastisol resin particles. The ionic crosslinking herein is made through the carboxyl group in the copolymer by addition of a monovalent or divalent metal cation.

In the ionic crosslinked copolymer in the copolymer particles of the component (A) in Invention 2, formation of the crosslinked structure is varied reversibly with heat unlike the crosslinked structure of covalent crosslinking, such as sulfur crosslinking or peroxide crosslinking. Surface of the particles modified by ionic crosslinking shows properties of the crosslinked structure at the room temperature and properties of the dissociated structure in the condition of processing by heat molding. As the result of this property, the ionic crosslinked copolymer of the invention shows both excellent storage stability and the excellent handling during the processing.

In the invention 2, a monovalent or divalent metal cation as the crosslinking agent forms the ionic crosslinking between the carboxyl groups present as the side chain of the copolymer in the outer shell of the resin particle of the plastisol. The three dimensional polymer structure formed on the outer shell of the dispersed particle reduces swelling of the copolymer at the room temperature. Thus, the storage stability of the viscosity of the dispersion is remarkably improved while the intrinsic physical properties of the heat molded products comprising the base copolymer and the dispersion medium are retained.

In the plastisol composition of Invention 1, the copolymer in the component (A) is prepared by copolymerization of an alkyl acrylate having alkyl group of 1 to 8 carbon atoms or an alkyl methacrylate having an alkyl group of 1 to 8 carbon atoms with a diene monomer.

Examples of the alkyl acrylate and the alkyl methacrylate are: methyl acrylate, ethyl acrylate, n-propyl acrylate, isopropyl acrylate, n-butyl acrylate, isobutyl acrylate, sec-butyl acrylate, t-butyl acrylate, n-hexyl acrylate, cyclohexyl acrylate, 2-ethylhexyl acrylate, n-octyl acrylate, methyl methacrylate, ethyl methacrylate, n-propyl methacrylate, isopropyl methacrylate, n-butyl methacrylate, isobutyl methacrylate, sec-butyl methacrylate, t-butyl methacrylate, n-hexyl methacrylate, cyclohexyl methacrylate, 2-ethylhexyl methacrylate, n-octyl methacrylate and the like. These compounds may be utilized singly or as a combination of two or more kinds. The preferable example among these compounds is methyl methacrylate.

Examples of the diene monomer are: conjugate diene compounds, such as butadiene, isoprene, 1,3-pentadiene, cyclopentadiene, dicyclopentadiene and the like and non-conjugate diene compounds, such as 1,4-hexadiene, ethylidenenorbornene and the like. These compounds may be utilized singly or as a combination of two or more kinds. Preferable examples among these compounds are butadiene and isoprene.

In the copolymer, the content of (a) the alkyl acrylate unit and/or the alkyl methacrylate unit is in the range from 98 to 50 weight %, preferably in the range from 95 to 70 weight %, and the content of (b) the diene monomer unit is in the range from 2 to 50 weight %, preferably in the range from 5 to 30 weight %, respectively based on the total amount of the component (a) and the component (b).

When the content of the component (b) is less than 2 weight %, the sheet formed by mixing of the copolymer with a plasticizer such as di-2-ethylhexyl phthalate and then by heat molding of the mixture is not readily plasticized and shows remarkable degree of bleeding. When the content of the component (b) is in the range from 2 to 5 weight %, the formed sheet may be whitened on elongation. When the content of the component (b) is more than 30 weight %, softening point of the copolymer becomes too low and the copolymer must be dried by coagulation because the spray drying is difficult in this condition. This process causes increase of viscosity of the plastisol and decrease of physical properties of the sheet and the condition is not advantageous. The plastisol exhibits stable viscosity and physical properties particularly when the contents of the component (a) and the component (b) are in the range from 95 to 70 weight % and in the range from 5 to 30 weight %, respectively.

In the plastisol composition of Invention 2, the copolymer in the component (A) is prepared by copolymerization of an alkyl acrylate having an alkyl group of 1 to 8 carbon atoms or an alkyl methacrylate having an alkyl group of 1 to 8 carbon atoms, a diene monomer and a radical polymerizable unsaturated carboxylic acid of 3 to 8 carbon atoms having a carboxyl group as the major components thereof.

The same kinds of the alkyl acrylate, the alkyl methacrylate and the diene monomer as described in Invention 1 can also be utilized here.

The radical polymerizable unsaturated carboxylic acid of 3 to 8 carbon atoms having a carboxyl group is a compound comprising one or more free carboxyl groups available for ionic crosslinking in the molecule. Examples of such a compound are: unsaturated monocarboxylic acid, such as acrylic acid, methacrylic acid, ethacrylic acid, crotonic acid, cinnamic acid and the like; unsaturated dicarboxylic acids, such as maleic acid, itaconic acid, fumaric acid, citraconic acid, chloromaleic acid and the like; anhydrides of these dicarboxylic acids; monoesters of unsaturated dicarboxylic acids, such as monomethyl maleate, monoethyl maleate, monobutyl maleate, monomethyl phthalate, monoethyl phthalate, monomethyl itaconate, monoethyl itaconate, monobutyl itaconate and the like; derivatives of these monoesters of dicarboxylic acids; and the like compounds. These compounds may be utilized singly or as a combination of two or more kinds. Preferable examples among these compounds are acrylic acid, methacrylic acid, maleic acid, maleic anhydride and itaconic acid.

In the copolymer, the content of (a) the alkyl acrylate unit and/or alkyl methacrylate unit is in the range from 97 to 50 weight %, preferably in the range from 90 to 70 weight %, the content of (b) the diene monomer unit is in the range from 2 to 40 weight %, preferably in the range from 5 to 30 weight % and the content of (c) the radical polymerizable unsaturated carboxylic acid unit is in the range from 1 to 20 weight %, preferably in the range from 2 to 10 weight %, respectively based on the total amount of the component (a), the component (b) and the component (c).

When the content of the component (b) is less than 2 weight %, the sheet formed by mixing the copolymer with a plasticizer such as di-2-ethylhexyl phthalate and then by heat molding of the mixture is not readily plasticized and shows remarkable degree of bleeding. When the content of the component (b) is in the range from 2 to 5 weight %, the formed sheet may be whitened on elongation. When the content of the component (b) is more than 40 weight %, softening point of the copolymer becomes too low and the copolymer must be dried by coagulation because the spray drying is difficult in this condition. This process causes increase of viscosity of the plastisol and decrease of physical properties of the sheet and the condition is not advantageous. When the content of the component (c) is less than 1 weight %, the modification effect of the surface by the ionic crosslinking is hardly exhibited and, when the content of the component (c) is more than 20 weight %, the mechanical properties of the base resin are often deteriorated while the modification effect of the ionic crosslinking is not enhanced.

In the copolymer in the component (A) in Invention 1 or in Invention 2 of the present invention, units of other monomers copolymerizable with the monomers described above may be comprised according to necessity within the range that they do not negatively effect the object of the invention. The content of the units of the other copolymerizable monomer is generally 20 weight % or less based on the total amount of the copolymer. The other copolymerizable monomer is, for example, an unsaturated monomer comprising a functional group for increasing adhesive property of the plastisol. Examples of the other copolymerizable monomer are: polymerizable unsaturated compounds having epoxy group, such as glycidyl (meth)acrylate, 3,4-epoxycyclohexylmethyl (meth)acrylate, cyclohexene monooxide and the like; polymerizable unsaturated compounds having a carboxyl group, such as acrylic acid, methacrylic acid, ethacrylic acid, maleic acid, fumaric acid, itaconic acid, anhydrides of these compounds and the like; polymerizable unsaturated compounds having an amino group, such as 2-aminoethyl (meth)acrylate, 2-aminopropyl (meth)acrylate, 3-aminopropyl (meth)acrylate, 2-aminobutyl (meth)acrylate, 3-aminobutyl (meth)acrylate, 4-aminobutyl (meth)acrylate, (meth)acrylamide, N-2-aminoethyl(meth)acrylamide, N-2-aminopropyl(meth)acrylamide, N-3-aminopropyl(meth)acrylamide and the like; polymerizable unsaturated compounds having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, dipentaerythritol hexa(meth)acrylate and the like; and the other like compounds. These compounds may be utilized singly or as a combination of two or more kinds.

The weight average molecular weight of the copolymer in the component (A) is not particularly limited but generally in the range from 100000 to 1500000 and preferably in the range from 200000 to 1000000.

The copolymer in the component (A) is preferably prepared by emulsion polymerization or seeding emulsion polymerization processes which are generally utilized for preparation of resins for paste processing. When a copolymer of a relatively larger particle size is required for the purpose of decreasing the sol viscosity or smoothness of the surface of the molded products, suspension polymerization or bulk polymerization can be advantageously utilized.

In the emulsion polymerization described above, the copolymerization of the alkyl (meth)acrylate and the diene monomer or the copolymerization of the alkyl (meth)acrylate, the diene monomer and the radical copolymerizable unsaturated carboxylic acid having a carboxyl group is conducted in an aqueous medium comprising an emulsifier and a polymerization initiator.

As the emulsifier, an anionic surface active agent or a combination of a nonionic surface active agent with the anionic surface active agent is generally utilized. Examples of the anionic surface active agent are conventional anionic surface active agents generally utilized for emulsion polymerization, such as salts of alkylbenzenesulfonic acids, salts of alkylsulfonic acids, ester salts of alkylsulfuric acids, metal salts of fatty acids, ester salts of polyoxyalkylether sulfuric acids, ester salts of polyoxyethylenecarboxylic acid ester sulfuric acids, ester salts of polyoxyethylene alkylphenyl ether sulfuric acids, salts of succinic acid dialkyl ester sulfonic acids and the like. These compounds may be utilized singly or as a combination of two or more kinds.

Examples of the nonionic surface active agent are: compounds having a polyoxyethylene chain in the molecule and having surface activity, such as polyoxyethylene alkyl phenyl ethers, polyoxyethylene alkyl ethers, polyoxyethylene fatty acid esters, polyoxyethylene sorbitane fatty acid esters, polyoxyethylene alkyl ether glycerine boric acid esters, polyoxyethylene alkyl ether phosphoric acid esters, polyoxyethylene and the like; compounds in which the polyoxyethylene chain is replaced by copolymers of oxyethylene and oxypropylene; sorbitane fatty acid esters; fatty acid glycerine esters; pentaerythritol fatty acid esters; and the like compounds. These compounds may be utilized singly or as a combination of two or more kinds.

The amount of the surface active agent utilized in the copolymerization is generally in the range from 0.1 to 5 weight parts based on 100 weight parts of the monomer utilized in the case of the anionic surface active agents and in the range from 0.1 to 5 weight parts based on 100 weight parts of the monomer utilized in the case of the nonionic surface active agents.

As the polymerization initiator, a water soluble inorganic peroxide or a combination of a water soluble reducing agent and an organic peroxide is utilized. Examples of the water soluble inorganic peroxide are potassium persulfate, ammonium persulfate and the like. Examples of the water soluble reducing agent are reducing agents generally utilized as a water soluble component in radical oxidation reduction polymerization catalysts, such as ethylenediamine tetraacetic acid, sodium salt and potassium salt of ethylenediamine tetraacetic acid, complex compounds of these compounds with a heavy metal like iron, copper, chromium and the like, sulfinic acid, sodium salt and potassium salt of sulfinic acid, L-ascorbic acid, sodium salt, potassium salt and calcium salt of L-ascorbic acid, ferrous pyrophosphate, ferrous sulfate, ferrous ammonium sulfate, sodium sulfite, sodium hydrogen sulfite, sodium formaldehydesulfoxylate, reducing sugars and the like. These compounds may be utilized singly or as a combination of two or more kinds. The amount of the reducing agent utilized in the polymerization is generally in the range from 0.0001 to 5 weight parts based on 100 weight parts of the monomer utilized.

Examples of the organic peroxide are hydroperoxides, such as cumene hydroperoxide, p-cymene hydroperoxide, t-butylisopropylbenzene hydroperoxide, diisopropylbenzene hydroperoxide, p-menthane hydroperoxide, decaline hydroperoxide, t-amyl hydroperoxide, t-butyl hydroperoxide, isopropyl hydroperoxide and the like. These compounds may be utilized singly or as a combination of two or more kinds. The amount of the organic peroxide utilized in the polymerization is generally in the range from 0.001 to 5 weight parts based on 100 weight parts of the monomer utilized.

In the emulsion polymerization, higher fatty acids, higher alcohols, inorganic salts, water soluble macromolecular compounds and the like may be additionally utilized for the purpose of enhancing the action of the emulsifier and the polymerization initiator.

The emulsion polymerization is generally conducted at a temperature in the range from 30° to 80° C. A latex comprising micro particles of a copolymer having diameters in the range from 0.03 to 0.7 μm and homogeneously dispersed in the medium can be obtained by the methods described above. The latex is generally treated by a generally known treatment such as salting out and spray drying and the copolymer is recovered as a solid product. Molecular weight of the copolymer is suitably adjusted according to the application by controlling the reaction temperature or by adding a molecular weight adjusting agent.

In the seeding emulsion polymerization, the resin particle prepared in the emulsion polymerization described above is utilized as a core and the particle is made to grow larger by polymerization reaction in an aqueous medium. An emulsifier comprising a combination of the anionic surface active agent described above and/or the nonionic surface active agent described above and a polymerization initiator comprising the water soluble inorganic peroxide described above or a combination of the water soluble reducing agent described above and the organic peroxide described above are utilized in the polymerization. Average diameter of the core particle is generally in the range from 0.03 to 0.7 μm and amount of the core particle is generally in the range from 1 to 50 weight parts based on 100 weight parts of the monomer utilized. Amounts of the emulsifier and the polymerization initiator are the same as in the emulsion polymerization described above.

A preferred example of the seeding emulsion polymerization is described in the following. An aqueous emulsion of the desired resin core particles is first prepared. The water soluble reducing agent described above and the monomer are added to the emulsion and the mixture is heated and kept at a temperature of 30° to 80° C. An aqueous emulsion of an organic peroxide and an aqueous solution of an emulsifier are separately prepared by using the emulsifier described above. The emulsion and the solution separately prepared here are continuously added to the aqueous emulsion comprising the resin core particles, the water soluble reducing agent and the monomer while they are kept at a temperature of 30° to 80° C. and the polymerization reaction is allowed to proceed. In the seeding emulsion polymerization, higher fatty acids, higher alcohols, inorganic salts, water soluble macromolecular compounds and the like may be additionally utilized for the purpose of enhancing the action of the emulsifier and the polymerization initiator.

After the polymerization reaction is finished, the emulsion comprising particles having an average diameter of 0.3 to 2 μm is treated in the same way as in the emulsion polymerization and the copolymer is separated as a solid product. Molecular weight of the copolymer can be adjusted according to the application by adjusting the polymerization temperature or by adding a molecular weight adjusting agent.

The copolymer particle of the component (A) in Invention 1 can be prepared by making the copolymer into a powder form. The copolymer can be made into the powder form by utilizing various kinds of conventional methods. For example, the copolymer can be obtained in a powder form directly by the polymerization, such as the emulsion polymerization and the seeding emulsion polymerization described above. As another example, the copolymer obtained in a solid form can be pulverized to the powder form.

The ionic crosslinked copolymer of the component (A) of Invention 2 is prepared by ionic crosslinking the carboxyl groups in the copolymer described above by adding a monovalent or divalent metal cation to the copolymer.

An ionic crosslinked copolymer in which carboxyl groups are crosslinked by a trivalent metal cation requires a higher temperature for dissociation of the crosslinking than the copolymer crosslinked by a monovalent or divalent metal cation and molded products having inferior physical properties are obtained because of insufficient gelation unless the heat molding is made at a higher temperature. Even though a monovalent cation is utilized, when it is a cation other than a metal cation, such as ammonium cation, the cation is not effective for suppressing the increase of viscosity with time.

The kind of the monovalent ion and the divalent ion is not particularly limited. Examples of such cation are potassium cation, sodium cation, magnesium cation, calcium cation, barium cation, iron cation, nickel cation, copper cation, zinc cation, cesium cation, tin cation, chromium cation, lead cation, strontium cation and the like cations. These cations may be utilized singly or as a combination of two or more kinds. Preferable cations among them are potassium cation, zinc cation and calcium cation.

The ionic crosslinked copolymer of the component (A) can be prepared by adding the monovalent or divalent metal cation or a metal cation source which can form the monovalent or divalent metal cation to the copolymer described above. The monovalent metal cation may added directly or in the form of a solution such as an aqueous solution.

Examples of the metal cation source forming the monovalent or divalent metal cation are the following compounds comprising the monovalent or divalent metal cation: hydroxides; phosphates; carbonates; nitrates; sulfates; chlorides; nitrites; sulfites; salts of organic acids, such as octoic acid, stearic acid, oleic acid, capric acid, formic acid, succinic acid, erucic acid, linolenic acid, palmitic acid, propionic acid, acetic acid, adipic acid, butyric acid, naphthenic acid, thiocarboxylic acid and the like; acetylacetone salts; alcoholates, such as ethoxide, methoxide and the like. Hydroxides and salts of carboxylic acids comprising the monovalent metal are preferable among them because of efficient reaction and easy deformation during the heat molding.

The monovalent and divalent metal cations are preferable because they do not require heating of a long time for crosslinking reaction unlike trivalent metal cations and the ion crosslinking reaction can be performed at the room temperature within several minutes in solutions.

When the radical polymerizable unsaturated carboxylic acid comprising a carboxyl group is copolymerized in an aqueous polymerization system, most of the carboxyl groups are concentrated on the surface of the outer shell because of their polar nature. On addition of a metal cation source into the aqueous phase, the probability of encounter of the metal cation dissociated in the aqueous medium with the carboxylic acid, having a high tendency to dissociate, is quite high because of the nature of the ionic reaction and because the ionic crosslinking reaction is completed in a short time.

Temperature dependency of the ionic crosslinking reaction of the copolymer in the micro particles is small and the amount of the metal ion in the copolymer after the ionic crosslinking is constant in the temperature range from 0° to 50° C. Thus, temperature control is unnecessary in the ionic crosslinking reaction and the specified and uniform ionic crosslinking can be obtained very easily.

In the ionic crosslinked copolymer, a part or all of the free carboxyl group are ionized to form carboxyl cations and ionic linkages are formed by taking the monovalent or divalent metal cation as the counter cation. Therefore, degree of the ionic crosslinking can be easily adjusted by the amount of the added metal cation source. The ionic crosslinking reaction described above proceeds generally quantitatively. However, an excess amount of the monovalent or divalent metal cation or the metal cation source can be utilized. The presence of the ionic crosslinking can be easily analyzed by measuring absorption of the carboxylate group in the infrared spectroscopy, by determining the amount of the metal cation or by measuring the degree of swelling of the copolymer in a solvent. The dissociation property and the density of the ionic crosslinking can be analyzed by the differential thermal analysis and by the measurement of the degree of swelling of the copolymer in a solvent, respectively.

For efficient preparation of the ionic crosslinked copolymer of the component (A) of Invention 2, mol ratio of the metal atom in the monovalent or divalent metal cation or in the metal cation source to the free carboxyl group in the copolymer must be selected suitably according to the desired degree of crosslinking. The amount in mol of the metal cation or metal cation source to be added is preferably in the range from 0.1 to 3 times, more preferably in the range from 0.5 to 1.5 times, the amount in mol of the carboxylic acid in the copolymer. In this range of the amount of the metal cation, the crosslinked copolymer of the invention exhibits most excellent mechanical properties. When the mol ratio is smaller than 0.1, the modifying effect of the surface of the invention is inferior and, when the mol ratio is larger than 3, the mechanical properties of the copolymer are deteriorated.

The amount of the carboxyl group which does not participate in the ionic crosslinking is preferably less than 1 weight % of the total weight of the copolymer for keeping the water resistance good.

The ionic crosslinked copolymer can be prepared, for example, by the following methods: (1) a method of dissolving the copolymer described above in a suitable solvent and then adding the metal cation or the metal cation source directly or as a solution such as an aqueous solution to the solution prepared above, allowing the ionic crosslinking reaction to proceed; (2) a method of adding the metal cation or the metal cation source directly or as a solution such as an aqueous solution to the latex obtained after the polymerization of the copolymer; and (3) a method of adding the metal cation or the metal cation source in the process of mixing the powder of the copolymer to the dispersion medium to prepare the dispersion. All of these methods can be utilized as the method of preparation of the ionic crosslinked copolymer of the invention. The method of adding to the latex (2) is preferable among them because of easiness of processing and efficiency of the dispersion.

In the copolymer particle of the component (A) in Invention 2, the whole part of the particle may be made into the ionic crosslinked material in which the copolymer comprising the free carboxyl group is crosslinked by ionic crosslinking or the outer shell part alone may be made into the ionic crosslinked material.

The copolymer particles of the component (A) in Invention 2 can be prepared by making the ionic crosslinked copolymer into a powder form. As the method of making the ionic crosslinked copolymer into a powder form, various conventional methods can be utilized. For example, the copolymer particles can be prepared by adding the metal cation source or an aqueous solution thereof to the dispersion of the copolymer and, after ionic crosslinking, the product is dried by the spray drying method or the like.

The diameter of the copolymer particles of the component (A) in Invention 1 and Invention 2 is not particularly limited but can be the same as that of the particles generally utilized for plastisol, which is generally in the range from 0.03 to 5 μm.

In the composition of the invention, a plasticizer is utilized as the component (B). The kind of the plasticizer is not particularly limited but plasticizers generally utilized in conventional polyvinyl chloride plastisols may be utilized. Examples of such plasticizer are: derivatives of phthalic acid, such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, di(heptyl, nonyl, undecyl) phthalate, benzyl phthalate, butyl benzyl phthalate, dinonyl phthalate, dicyclohexyl phthalate and the like; derivatives of isophthalic acid, such as dimethyl isophthalate, di-(2-ethylhexyl) isophthalate, diisooctyl isophthalate and the like; derivatives of tetrahydrophthalic acid, such as di-(2-ethylhexyl) tetrahydrophthalate, di-n-octyl tetrahydrophthalate, diisodecyl tetrahydrophthalate and the like; derivatives of adipic acid, such as di-n-butyl adipate, di-(2-ethylhexyl) adipate, diisodecyl adipate, diisononyl adipate and the like; derivatives of azelaic acid, such as di-(2-ethylhexyl) azelate, diisooctyl azelate, di-n-hexyl azelate and the like; derivatives of sebacic acid, such as di-n-butyl sebacate, di-(2-ethylhexyl) sebacate and the like; derivatives of maleic acid, such as di-n-butyl maleate, dimethyl maleate, diethyl maleate, di-(2-ethylhexyl) maleate and the like; derivatives of fumaric acid, such as di-n-butyl fumarate, di-(2-ethylhexyl) fumarate and the like; derivatives of trimellitic acid, such as tri-(2-ethylhexyl) trimellitate, tri-n-octyl trimellitate, triisodecyl trimellitate, triisooctyl trimellitate, tri-n-hexyl trimellitate, triisononyl trimellitate and the like; derivatives of pyromellitic acid, such as tetra-(2-ethylhexyl) pyromellitate, tetra-n-octyl pyromellitate and the like; derivatives of citric acid, such as triethyl citrate, tri-n-butyl citrate, acetyl triethyl citrate, acetyl tri-(2-ethylhexyl) citrate and the like; derivatives of itaconic acid, such as monomethyl itaconate, monobutyl itaconate, dimethyl itaconate, diethyl itaconate, dibutyl itaconate, di-(2-ethylhexyl) itaconate and the like; derivatives of oleic acid, such as butyl oleate, glyceryl monooleate, diethyleneglycol monooleate and the like; derivatives of ricinoleic acid, such as methyl acetyl ricinoleate, butyl acetyl ricinoleate, glyceryl monoricinoleate, diethyleneglycol monoricinoleate and the like; derivatives of stearic acid, such as n-butyl stearate, glycerine monostearate, diethyleneglycol distearate and the like; derivatives of fatty acids, such as diethyleneglycol monolaurate, diethyleneglycol dipelargonate pentaerythritol fatty acid ester and the like; derivatives of phosphoric acid, such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, tris-(chloroethyl) phosphate and the like; derivatives of glycols, such as diethyleneglycol dibenzoate, dipropyleneglycol dibenzoate, triethyleneglycol dibenzoate, triethyleneglycol di-(2-ethylbutyrate), triethyleneglycol di-(2-ethylhexoate), dibutyl methylene-bis-thioglycolate and the like; derivatives of glycerine, such as glycerine monoacetate, glycerine triacetate, glycerine tributyrate and the like; epoxy derivatives, such as epoxidized soybean oil, epoxybutyl stearate, di-2-ethylhexyl epoxyhexahydrophthalate, diisodecyl epoxyhexahydrophthalate, epoxytriglyceride, epoxidized octyl oleate, epoxidized decyl oleate and the like; polyester plasticizers, such as polyesters derived from adipic acid, polyesters derived from sebacic acid, polyesters derived from phthalic acid and the like; partially hydrogenated terphenyl; adhesive plasticizers; polymerizable plasticizers, such as diallyl phthalate, acrylic monomers and oligomers and the like; and other like plasticizers. Among these plasticizers, plasticizers derived from phthalic acid esters are preferable. The plasticizer may be utilized singly or as a combination of two or more kinds. A solution of macromolecular compounds, such as rubber and resin, dissolved in a plasticizer may be utilized.

Amount of the plasticizer of the component (B) utilized in the composition of the invention is generally in the range from 40 to 250 weight parts and preferably in the range from 60 to 120 weight parts based on 100 weight parts of the copolymer particles of the component (A).

In the composition of the invention, the copolymer in the component (A) comprises the diene monomer unit and the physical properties of the copolymer may be improved by adding a vulcanizing agent (crosslinking agent) as the component (C) according to necessity. Particularly when a suitable kind of the vulcanizing agent is utilized, tensile strength of the copolymer can be increased without sacrificing the plasticizing property. Examples of such vulcanizing agent are: sulfur, dioximes, phenol resins, zinc oxide, magnesium oxide, litharge, polyamines and the like. These agents may be utilized singly or as a combination of two or more kinds. A combination of sulfur and zinc oxide is particularly effective for improving the tensile strength of a sheet.

The amount of the vulcanizing agent is generally in the range from 0.5 to 5 weight parts and preferably in the range from 1 to 3 weight parts based on 100 weight parts of the copolymer. When sulfur is utilized, a micro powder of 200 mesh or finer is preferred and it is also preferred that sulfur is mixed with the liquid components in the compounding ingredients by using a three roller mill before addition to the copolymer. When zinc oxide is utilized, the activated zinc oxide is more effective.

When the copolymer comprises units of unsaturated monomer having a functional group, the following vulcanizing agents may be utilized in addition to the vulcanizing agents described above; acidic phosphoric acid esters, triazines, polyamines, polyamides and the like when the functional group is epoxy group; polycarboxylic acids, polyepoxy compounds and the like when the functional group is amino group; polyisocyanate compounds and the like when the functional group is hydroxyl group; and polyamides, polyamines, polyepoxy compounds and the like when the functional group is carboxyl group.

Vulcanization accelerators, such as thiurams, guanidines, thiazols, dithiocarbamates, aldehyde-amines, aldehyde-ammonias, sulfenamides, thioureas, xanthates and the like, may be additionally utilized. The vulcanization accelerator may be utilized singly or as a combination of two or more kinds.

The amount of the vulcanization accelerator is generally in the range from 0.5 to 3 weight parts based on 100 weight parts of the copolymer.

Peroxide cure may also be effected by utilizing cumene hydroperoxide, dicumyl peroxide, 2,5-dimethyl- 2,5-(tertiary-butylperoxy)hexyne-3, 1,3-bis-(tertiary-butylperoxyisopropyl)benzene and the like.

Crosslinking other than the vulcanization can be introduced to the copolymer by addition of polyfunctional compounds such as diallyl phthalate, triallyl cyanurate, triethyleneglycol methacrylate, trimethylolpropane trimethacrylate and the like.

In the plastisol composition of the invention, other ingredients which are generally utilized in conventional polyvinyl chloride resin plastisols may be comprised within the range that they do not negatively effect the object of the invention. Examples of such other ingredients are fillers, blowing agents, blowing accelerators, surface active agents, thixotropic agents, adhesives, pigments, diluents, ultraviolet light absorbents, antioxidants, reinforcing materials, other resins and the like.

Examples of the filler are calcium carbonate, mica, talc, kaolin clay, celite, asbestos, perlite, baryta, silica, silica sand, graphite flake, dolomite lime stone, gypsum, aluminum fine powder, hollow balloon and the like.

Examples of the blowing agent utilized for preparing foamed products are azo blowing agents, such as azodicarbonamide, azobisformamide and the like, dinitrosopentamethylenetetramine, benzenesulfonyl hydrazide, toluenesulfonyl hydrazide, p,p'-hydroxybenzenesulfonyl hydrazide and the like. Examples of the blowing accelerator are zinc oxide, lead stearate, cadmium stearate, zinc stearate, barium stearate, sodium compounds, potassium compounds, urea and the like. The smaller the diameter of the particles of the blowing agent is the better for preparing fine structure foamed products having uniform cell diameter and tough thick cell membrane. Particularly, the foam having the optimum cell diameter of 0.1 to 0.6 mm, preferably of about 0.3 mm, can stand firmly against backpressure in the matrix. For efficient preparation of the foam of this structure, the blowing agent having particles of uniform diameter of preferably 20 μm or less, more preferably of 10 μm or less is utilized. A surface active agent may be utilized additionally for preparing foamed products of still better cell structure. Ionic surface active agents, particularly anionic surface active agents are preferably utilized. Examples of such surface active agent are: ester salts of alkylsulfuric acids, such as ester sodium of laurylsulfuric acid, ester sodium of myristylsulfuric acid and the like; salts of alkylarylsulfonic acids, such as sodium dodecylbenzenesulfonate, potassium dodecylbenzenesulfonate and the like; ester salts of sulfosuccinic acid, such as sodium dioctylsulfosuccinate, sodium dihexylsulfosuccinate and the like; salts of fatty acids, such as ammonium laurate, potassium stearate and the like; ester salts of polyoxyethylenealkylsulfuric acids; ester salts of polyoxyethylenealkylarylsulfuric acid; salts of rosin acid and the like compounds. The amount of the surface active agent utilized is generally in the range from 0.05 to 5 weight parts, preferably 0.2 to 3.0 weight parts, based on 100 weight parts of the copolymer particles of the component (A). The surface active agent may be added by spraying to the particles, followed by drying to achieve homogeneous adsorption. It may also be added by mixing with the copolymer particles in the latex stage after the polymerization or by dispersing into the plastisol.

Examples of the thixotropic agent are: inorganic micro powders, such as derivatives of silicic acid like anhydrous silicic acid, hydrous silicic acid, calcium carbonate and the like; thixotropic agents of organic-inorganic composites, bentonites, such as organic bentonites and the like; asbestos materials, such as Sylodex ® (a product of Fuji-Davison Chemical Ltd.) and the like; organic thixotropic agents, such as dibenzilidene sorbitol and the like; and the like materials.

As the adhesive agent utilized for enhancing adhesive ability, polyethyleneimine, polyamide resins, epoxy resins, coupling agents of silane derivatives and titanate derivatives and the like are utilized. As the epoxy resins, polyglycidyl compounds are utilized. Examples of such polyglycidyl compounds are (1) diglycidyl ethers based on bisphenol A, bisphenol F, resorcinol and the like; (2) polyglycidyl ethers of phenol novolak resins, cresol novolak resins and the like; (3) diglycidyl ethers of hydrogenated bisphenol A; (4) glycidyl amine derivatives; (5) linear aliphatic epoxy derivatives; and (6) diglycidyl esters of phthalic acid, hexahydrophthalic acid, tetrahydrophthalic acid and the like. In combination with the epoxy resins described above, reactive diluents, such as butyl glycidyl ether, allyl glycidyl ether, phenyl glycidyl ether, cresyl glycidyl ether, versatic acid glycidyl ether and the like, non reactive diluents, such as dibutyl phthalate, dioctyl phthalate, butyl benzyl phthalate, tricresyl phosphate, acetyl tributyl citrate, aromatic process oils, pine oil, Hisol ® (aromatic hydrocarbons having a high boiling point synthesized from naphtha a product of Nippon Petrochemical Co., Ltd.), 2,2,4-trimethyl-1,3-pentanediol diisobutyrate and the like, and the like other epoxy resin diluents can be utilized. Curing agents, such as dicyandiamide, 4,4'-diaminodiphenylsulfone, imidazol derivatives like 2-n-heptadecylimidazol, isophthalic acid hydrazide, N,N-dialkylurea derivatives, acid anhydrides like tetrahydrophthalic anhydride and the like, isophorone diamine, m-phenylenediamine, N-aminoethylpiperadine, boron trifluoride complexes, carboxylic acid imides, tris-dimethylaminomethylphenol, melamine, guanamine, polycarboxylic acid polyhydrazide and the like, may be utilized singly or as a combination of two or more kinds. The curing agent is utilized in an amount sufficient for converting the epoxy resin into an insoluble infusible crosslinked product. Examples of the cure accelerator of epoxy resins are alcohols, phenols, mercaptane derivatives, dimethylurea derivatives, aliphatic compounds, imidazols, 3-(p-chlorophenyl)-1,1-dimethyl urea, chlorotoluene and the like.

As the pigment, color pigments and fillers are utilized. Examples of the color pigment are: white inorganic pigments, such as titanium dioxide, zinc oxide, white lead and the like; black inorganic pigments, such as carbon black, acetylene black, graphite and the like; red inorganic pigments, such as vermilion, cadmium red, antimony vermilion, red oxide and the like; blue inorganic pigments, such as iron blue, ultramarine blue, cobalt blue and the like; green inorganic pigments, such as chromium oxide green, Guignee's green, chromium green, zinc green, green earth and the like; iron oxide inorganic pigments having various kinds of color; and organic pigments, such as azo compounds, phthalocyanine compounds, threne compounds, quinacridone compounds, dioxazine compounds, isoindolinone compounds and the like. Examples of the fillers are: chalk, precipitated calcium carbonate, gohun (an extender pigment prepared from crushed shell having calcium carbonate as a main component), baryte powder, precipitated barium sulfate, clay, talc, silica powder, silicious earth, alumina, gypsum and the like.

Preferable examples of the diluent are xylene, solvent naphtha, mineral spirit, methyl isobutyl ketone, butyl acetate and the like. Preferable examples of the ultraviolet light absorbent are benzotriazole compounds, such as 2-(2'-hydroxy-5'-methylphenyl)benzotriazole, 2-(2'-hydroxy-3'-tertiary-butyl-5'-methylphenyl)-5-chlorobenzotriazole, 2-(2'-hydroxy-3',5'-di-tertiary-butylphenyl)-5-chlorobenzotriazole, 2-(2'-hydroxy-4'-octoxyphenyl)benzotriazole and the like. Hindered amine light stabilizers can be utilized favorably as well.

Preferable examples of the antioxidant are phenolic antioxidants, such as 2,6-ditertiary-butyl-p-cresol, 2,2'-methylene-bis-(4-methyl-6-tertiary-butylphenol), 4,4'-butylidene-bis-(3-methyl-6-tertiary-butylphenol), 4,4'-thio-bis-(3-methyl-6-tertiary-butylphenol) and the like.

Examples of the reinforcing material are asbestos, alumina white, glass fiber, single crystal potassium titanate, alumina fiber, carbon fiber, ceramic fiber, various kinds of whiskers and the like. Examples of other resins are N-acylalkyleneimine polymers, maleimide polymers and the like.

The method of preparation of the plastisol composition of the invention is not particularly limited but methods generally utilized for preparation of conventional plastisols are adopted. For example, the copolymer particles of the component (A), the plasticizer of the component (B), the optionally utilized vulcanizing agent of the component (C) and other components are adequately mixed together by using a conventional mixing apparatus, such as planetary mixer, kneader, roll and the like, to prepare the plastisol composition of the invention.

The acrylic ester copolymer plastisol composition of the invention thus prepared has excellent storage stability even when generally used inexpensive plasticizers are used, giving molded sheet showing no bleeding and generating no toxic hydrochloric acid gas on heating to a high temperature, on burning or in case of fire. Furthermore, sheets and coating layers having properties as good as those of sheets and coating layers prepared from polyvinyl chloride plastisols can be prepared from the plastisol composition of the invention. It is advantageously utilized as materials for flooring materials, wall covering materials, toys, interior materials for automobiles, coated steel plates, sound damping steel plates, laminated glass plates, sealing materials, foamed materials and the like.

DESCRIPTION OF THE PREFERRED EMBODIMENTS

The invention will be understood more readily with reference to the following examples; however, these examples are intended to illustrate the invention and are not to be construed to limit the scope of the invention. All molecular weights are given on a weight-average basis.

Average molecular weight of copolymer, average diameter of particles, viscosity of plastisol and physical properties of a sheet prepared from the plastisol were evaluated by the following methods.

(1) Average molecular weight of copolymer

Copolymer particles were dissolved in tetrahydrofuran. Peak value of molecular weight measured by the gel permeation chromatography is shown as the value corresponding to the weight average molecular weight of polystyrene.

(2) Average diameter of particles

Average diameter of the primary particles at the end of the polymerization of copolymer resin or at the end of the ionic crosslinking of copolymer was measured on a photograph of ×10000 magnification taken by a transmission type electron microscope. Lengths of about 1000 particles were measured and averaged to obtain an average diameter of the primary particles.

Average diameter of the secondary particles comprising coagulated particles after the drying process was measured by screening as following. First, large particles were removed by screening with a 250 μm mesh screen. To 50 g of the particles which passed the screen, 50 mg of carbon black were added for prevention of static charge and the mixture was analyzed by the screening with the standard screen with vibration according to Japanese Industrial Standard. When the amount of the remaining particles was reduced to 50% of the original, the average diameter was obtained from the screen mesh at that time.

(3) Viscosity of plastisol

Viscosity of plastisol was measured at the temperature of 25° C. and the relative humidity of 60% by using a Blookfield type rotatory viscometer. The changes of viscosity with time in Examples and Comparative Examples shown in Table 1 were obtained by the following method: first, the initial viscosity was measured and recorded; the plastisol was kept at 30° C. for 7 days; then the plastisol was kept at the temperature of 25° C. and the relative humidity of 60% for 1 hour and then viscosity was measured; the viscosity value thus obtained was divided by the initial viscosity value to obtain the change of viscosity with time as an index. The changes of viscosity with time shown in Table 2 were obtained by the same method as described above except that the plastisol was kept at 40° C. for 14 days in place of at 30° C. for 7 days described above.

(4) Physical properties

A sheet for measurement of physical properties was prepared by coating a plastisol on a glass plate to the thickness of 0.3 mm, followed by heating at 140° C. for 20 minutes in an oven of a hot air circulation type. Tensile strength, elongation at break, hardness, bleeding resistance and water resistance were measured by using the sheet thus prepared.

Tensile strength was measured at the extension speed of 200 mm/min. For evaluation of bleeding, a sample sheet was left standing for 30 days in the atmosphere of the temperature of 25° C. and the relative humidity of 60% and condition of the sample was visually observed. The result was evaluated by the following criterion:

○: no bleeding found
Δ: slight bleeding found
X: bleeding found

For evaluation of water resistance, a sample piece of 20 mm ×50 mm was cut out from the sheet for evaluation of physical properties, dipped in water of 23° C. for 24 hours and taken out for visual observation. The result was evaluated by the following criterion:

○: transparent
Δ: semitransparent
X: whitened and not transparent

Copolymer particles, ionic crosslinked copolymer particles and plastisol were prepared by the following methods:

(5) Preparation of copolymer particles

Into a 10 l stainless steel autoclave equipped with a stirrer having blades of two steps, 100 weight parts in total of various monomers for copolymerization as shown in Table 1, 140 weight parts of distilled water, 0.8 weight parts of a sodium alkylsulfate as the emulsifier and 0.1 weight part of potassium persulfate as the polymerization initiator were charged and the polymerization was conducted at 60° C. for 5 to 9 hours. The latex obtained by the polymerization was spray dried in a nitrogen stream to prepare copolymer particles.

(6) Preparation of ionic crosslinked particles

Into a 10 l stainless steel autoclave equipped with a stirrer having blades of two steps, 100 weight parts in total of the various monomers for copolymerization as shown in Table 1, 140 weight parts of distilled water, 0.8 weight parts of a sodium alkylsulfate as the emulsifier and 0.1 weight parts of potassium persulfate as the polymerization initiator were charged and the polymerization was conducted at 60° C. for 5 to 9 hours. To the latex obtained by the polymerization, the cation source of the kind and the amount shown in Table 1 was added and mixed. An ionic crosslinked copolymer was obtained from the mixture by ionic crosslinking at 23° C. for 10 minutes and then spray dried in a nitrogen stream to prepare ionic crosslinked copolymer particles.

(7) Preparation of plastisol

Into a planetary mixer of a vacuum defoaming type, 100 weight parts in total of the components of the kind and the amount shown in Table 1 was charged all at once and the mixture was mixed for 20 minutes to prepare a plastisol.

EXAMPLE 1

A copolymer prepared from 85 weight parts of methyl methacrylate and 15 weight parts of butadiene by the method described above was spray dried to obtain a resin powder comprising the copolymer. The resin powder had the molecular weight of the copolymer of 310000, the average diameter of the primary particles of 0.3 μm and the average diameter of the secondary particles of 50 μm.

A plastisol was prepared from 100 weight parts of the resin powder prepared above and 100 weight parts of di-2-ethylhexyl phthalate.

The plastisol thus prepared had a viscosity suitable for easy application for coating. A sheet prepared by heat treatment of the plastisol could be plasticized without bleeding and had sufficient mechanical strength for application as a soft coating material. This sheet was transparent and not whitened under extension.

EXAMPLE 2

A plastisol was prepared and evaluated by the same method as in Example 1 except that isoprene was used in place of butadiene in Example 1. The resin powder prepared had the molecular weight of the copolymer of 360000, the average diameter of the primary particles of 0.3 μm and the average diameter of the secondary particles of 40 μm.

The same results as in Example 1 were obtained by the evaluation.

EXAMPLE 3

A plastisol was prepared and evaluated by the same method as in Example 1 except that a vulcanizing agent was additionally used. Tensile strength of the sheet was improved and elongation at break was decreased. Hardness of the sheet was somewhat increased.

EXAMPLE 4

A resin powder was prepared by spray drying a copolymer obtained from 50 weight parts of methyl methacrylate, 20 weight parts of ethyl acrylate and 30 weight parts of butadiene. The resin powder prepared had the molecular weight of the copolymer of 350000, the average diameter of the primary particles of 0.3 μm and the average diameter of the secondary particles of 50 μm. A plastisol was prepared from the resin powder prepared above by the same method as in Example 1. Though the plastisol obtained had a higher initial viscosity and a slightly larger change of viscosity with time, the sheet prepared from this plastisol had a higher elongation at break. This plastisol was more suitable for processing by extrusion rather than for processing by high speed coating or spraying.

EXAMPLE 5

A plastisol was prepared and evaluated by the same method as in Example 1 except that diisodecyl phthalate having a larger molecular weight was used as the plasticizer in place of di-2-ethylhexyl phthalate in Example 1. The sheet obtained showed no bleeding like the sheet in

EXAMPLE 1

A plastisol could be obtained by using diheptyl phthalate having a smaller molecular weight in place of the plasticizers described above. However, the plastisol obtained in this case showed increase of viscosity with time.

COMPARATIVE EXAMPLE 1

A plastisol was prepared and evaluated by the same method as in Example 1 except that homopolymer of methyl methacrylate was used in place of the copolymer in Example 1. Though a plastisol could be obtained, the sheet prepared by heat molding of this plastisol showed so much bleeding that the evaluation was not possible. Most of the plasticizer mixed into the plastisol was separated by bleeding. The sheet was not soft at all, fragile and broken easily. Thus, the properties of the sheet were dramatically different from those of the sheet in Example 1.

COMPARATIVE EXAMPLE 2

A plastisol was prepared and evaluated by the same method as in Example 1 except that n-butyl acrylate was used as the comonomer to copolymerize with methyl methacrylate in place of butadiene in Example 1. Though a plastisol could be obtained and a sheet could be prepared by heat molding, the sheet had a lower mechanical strength than that in Example 1 and showed bleeding.

COMPARATIVE EXAMPLE 3

A plastisol was prepared and evaluated by the same method as in Example 1 except that ethyl acrylate was used in place of butadiene in Example 1. The same results as in Comparative Example 2 were obtained.

COMPARATIVE EXAMPLE 4

A plastisol was prepared and evaluated by the same method as in Example 1 except that styrene was used in place of butadiene in Example 1. The plastisol obtained showed remarkable increase of viscosity. The sheet obtained showed remarkable decrease of tensile strength and a large extent of bleeding than the sheet in Comparative Example 2. Plasticizing effect was not observed either.

COMPARATIVE EXAMPLE 5

A plastisol was prepared and evaluated by the same method as in Example 1 except that acrylonitrile was used in place of butadiene in Example 1. The same results as in Comparative Example 4 were obtained.

COMPARATIVE EXAMPLE 6

A copolymer was prepared from 45 weight parts of methyl methacrylate and 55 weight parts of butadiene by the emulsion polymerization. The copolymer obtained could not be spray dried unlike the copolymer in Example 1.

TABLE 1

(Part 1)

| | 1 | 2 | 3 | 4 | 5 |
|---|---|---|---|---|---|
| Example | 1 | 2 | 3 | 4 | 5 |
| Comparative Example | — | — | — | — | — |
| composition of the material (weight parts) | | | | | |
| monomer | | | | | |
| methyl methacrylate | 85 | 85 | 80 | 50 | 85 |
| n-butyl acrylate | — | — | — | — | — |
| ethyl acrylate | — | — | — | 20 | — |
| butadiene | 15 | — | 15 | 30 | 15 |
| isoprene | — | 15 | — | — | — |
| styrene | — | — | — | — | — |
| acrylonitrile | — | — | — | — | — |
| plasticizer | | | | | |
| di-2-ethylhexyl phthalate | 100 | 100 | 100 | 100 | — |
| diisodecyl phthalate | — | — | — | — | 100 |
| vulcanizing agent | | | | | |
| sulfur | — | — | 1.5 | — | — |
| activated zinc oxide | — | — | 5.0 | — | — |
| vulcanization accelerator[3] | — | — | 1.5 | — | — |
| plastisol viscosity | | | | | |
| initial (poise) | 163 | 188 | 290 | 325 | 192 |
| change with time | 2.8 | 3.4 | 2.7 | 6.2 | 2.7 |
| sheet physical properties | | | | | |
| tensile strength (kg/cm2) | 88 | 82 | 113 | 79 | 77 |
| elongation (%) | 260 | 240 | 190 | 290 | 150 |
| hardness (Shore-A) | 62 | 64 | 67 | 58 | 63 |
| bleeding resistance | ○ | ○ | ○ | ○ | ○ |

(Part 2)

| | | | | | | |
|---|---|---|---|---|---|---|
| Example | — | — | — | — | — | — |
| Comparative Example | 1[1] | 2 | 3 | 4 | 5 | 6[2] |
| composition of the material (weight parts) | | | | | | |
| monomer | | | | | | |
| methyl methacrylate | 100 | 85 | 85 | 85 | 85 | 45 |
| n-butyl acrylate | — | 15 | — | — | — | — |
| ethyl acrylate | — | — | 15 | — | — | — |
| butadiene | — | — | — | — | — | 55 |
| isoprene | — | — | — | — | — | — |
| styrene | — | — | — | 15 | — | — |
| acrylonitrile | — | — | — | — | 15 | — |
| plasticizer | | | | | | |
| di-2-ethylhexyl phthalate | 100 | 100 | 100 | 100 | 100 | 100 |
| diisodecyl phthalate | — | — | — | — | — | — |
| vulcanizing agent | | | | | | |
| sulfur | — | — | — | — | — | — |
| activated zinc oxide | — | — | — | — | — | — |
| vulcanization accelerator[3] | — | — | — | — | — | — |
| plastisol viscosity | | | | | | |
| initial (poise) | 245 | 491 | 368 | 915 | 1620 | 3890 |
| change with time | 1.9 | 2.2 | 2.6 | 2.2 | 2.9 | gel |
| sheet physical properties | | | | | | |
| tensile strength (kg/cm2) | — | 64 | 55 | 27 | 28 | <20 |
| elongation (%) | — | 170 | 170 | 60 | 50 | 340 |
| hardness (Shore-A) | — | 69 | 72 | 89 | 90 | 41 |
| bleeding resistance | x | Δ | Δ | Δ | Δ | ○ |

[1] The sheet in Comparative Example 1 showed so much bleeding that a sheet suitable for measurement of properties could not be obtained.
[2] The latex obtained could not be spray dried. The copolymer in Comparative Example 6 was obtained by coagulation and drying.
[3] N-cycloakyl-2-benzothiazylsulfenamide

EXAMPLE 6

To latex of a copolymer prepared from 82 weight parts of methyl methacrylate, 15 weight parts of butadiene and 3 weight parts of methacrylic acid by the method of preparation of particles of ionic crosslinked copolymer described above, 2 weight parts of potassium hydroxide was added and the mixture was spray dried to obtain a resin powder comprising the ionic crosslinked copolymer. The copolymer had the average molecular weight of the copolymer of 320000, the average diameter of the primary particles of 0.3 $\mu$m and the average diameter of the secondary particles of 50 $\mu$m. The amount of carboxyl group which did not participate in the ionic crosslinking in the copolymer was 0.1 weight % or less based on the total amount of the copolymer. A plastisol was prepared from 100 weight parts of this resin powder and 100 weight parts of di-2-ethylhexyl phthalate.

The plastisol thus prepared had excellent stability of viscosity and the viscosity suitable for easy application was maintained for a long time. When workability of application is considered, it is preferred that the index of change of viscosity with time is 1.5 or less. The sheet obtained by heat treatment of this plastisol was plasticized without bleeding and had sufficient mechanical strength for application as a soft coating material. Furthermore, this sheet was transparent and did not show whitening on extension in the tensile test. Results on the measurement of viscosity of the plastisol and physical properties of the sheet are shown in Table 2.

EXAMPLE 7

A plastisol and a sheet were prepared and evaluated by the same method as in Example 6 except that zinc acetate was used as the metal cation source in place of potassium hydroxide in Example 6. The copolymer had the average molecular weight of the copolymer of 320000, the average diameter of the primary particles of 0.3 $\mu$m and the average diameter of the secondary particles of 50 $\mu$m. The amount of carboxyl group which did not participate in the ionic crosslinking in the copolymer was 0.1 weight % or less based on the total amount of the copolymer. Results of the evaluation of the plastisol and the sheet were similar to the results in Example 6.

EXAMPLE 8

A plastisol and a sheet were prepared and evaluated by the same method as in Example 6 except that isoprene was used in place of butadiene in Example 6. The copolymer had the average molecular weight of the copolymer of 360000, the average diameter of the primary particles of 0.3 $\mu$m and the average diameter of the secondary particles of 40 $\mu$m. The amount of carboxyl group which did not participate in the ionic crosslinking in the copolymer was 0.1 weight % or less based on the total amount of the copolymer. Results of the evaluation of the plastisol and the sheet were similar to the results in Example 6.

REFERENCE EXAMPLE 1

By the method of preparation of particles of ionic crosslinked copolymer described above, 85 weight parts of methyl methacrylate and 15 weight parts of butadiene were copolymerized. To the latex obtained, 3.0 weight parts of potassium hydroxide was added and the mixture was spray dried to obtain a resin powder comprising the ionic crosslinked copolymer. The copolymer had the average molecular weight of 310000, the average diameter of the primary particles of 0.3 $\mu$m and the average diameter of the secondary particles of 50 $\mu$m. A plastisol was prepared by using this resin powder by the same method as in Example 6. The plastisol showed about the same results as those of Example 6 regarding the viscosity and the mechanical properties of the sheet prepared by heating but the viscosity increased remarkably after keeping the plastisol at 40° C. for 2 weeks.

REFERENCE EXAMPLE 2

A plastisol and a sheet were prepared and evaluated by the same method as in Reference Example 1 except that isoprene was used in place of butadiene in Reference Example 1. The copolymer had the average molecular weight of the copolymer of 340000, the average diameter of the primary particles of 0.3 $\mu$m and the average diameter of the secondary particles of 40 $\mu$m. The plastisol and the sheet showed about the same properties as those of Reference Example 1.

REFERENCE EXAMPLE 3

Polymerization was performed by the same method as in Example 6 and then no cation source was added for preparation of a plastisol. Viscosity of the plastisol prepared by the same method as in Example 6 showed the index of the change of viscosity with time of 5 or more. Thus, the result was inferior.

REFERENCE EXAMPLE 4

A plastisol and a sheet were prepared and evaluated by the same method as in Example 7 except that no metal cation source was added. The index of the change of viscosity with time was close to 5, showing inferior stability of storage.

REFERENCE EXAMPLE 5

A plastisol prepared by using a resin powder prepared from a latex prepared by copolymerizing 65 weight parts of methyl methacrylate and 35 weight parts of butadiene followed by spray drying had extremely high initial viscosity and solidified during storage.

EXAMPLE 9

To latex of a copolymer prepared from 65 weight parts of methyl methacrylate, 30 weight parts of butadiene and 5 weight parts of methacrylic acid by the method of preparation of particles of ionic crosslinked copolymer described above, 3.3 weight parts of potassium hydroxide was added and the mixture was spray dried to obtain a resin powder comprising the ionic crosslinked copolymer. The copolymer had the average molecular weight of the copolymer of 260000, the average diameter of the primary particles of 0.2 $\mu$m and the average diameter of the secondary particles of 50 $\mu$m. The amount of carboxyl group which did not participate in the ionic crosslinking in the copolymer was 0.1 weight % or less based on the total amount of the copolymer. A plastisol was prepared by using this resin powder by the same method as in Example 6. The plastisol showed little change of viscosity with time and the molded product was soft and had a large elongation.

EXAMPLE 10

A plastisol and a sheet were prepared and evaluated by the same method as in Example 6 except that 82 weight parts of ethyl acrylate was used in place of methyl methacrylate in Example 6. The copolymer had the average molecular weight of the copolymer of 350000, the average diameter of the primary particles of 0.3 μm and the average diameter of the secondary particles of 50 μm. The amount of carboxyl group which did not participate in the ionic crosslinking in the copolymer was 0.1 weight % or less based on the total amount of the copolymer. Results of the evaluation of the plastisol and the sheet were similar to the results in Example 6.

COMPARATIVE EXAMPLE 7

A plastisol and a sheet were prepared and evaluated by the same method as in Example 6 except that 2.8 weight parts of aluminum hydroxide was used as the metal cation source in place of potassium hydroxide in Example 6. After the addition of aluminum ion, the mixture was kept stirring for 2 hours at the room temperature and then dried. The sheet obtained had a small tensile strength and a small elongation.

COMPARATIVE EXAMPLE 8

A plastisol was prepared and evaluated by the same method as in Example 6 except that ammonium hydroxide (1.3 weight parts as the pure compound) was used as the cation source in place of potassium hydroxide in Example 6. The plastisol obtained had a high initial viscosity and showed an index of change of viscosity with time as high as 5.

TABLE 2

(Part 1)

| | | | | | | | |
|---|---|---|---|---|---|---|---|
| Example | 6 | 7 | 8 | 9 | 10 | — | — |
| Comparative Example | — | — | — | — | — | 7 | 8 |
| Reference Example | — | — | — | — | — | — | — |
| monomer | | | | | | | |
| methyl methacrylate | 82 | 82 | 82 | 65 | — | 82 | 82 |
| ethyl acrylate | — | — | — | — | 82 | — | — |
| butadiene | 15 | 15 | — | 30 | 15 | 15 | 15 |
| isoprene | — | — | 15 | — | — | — | — |
| methacrylic acid | 3 | 3 | 3 | 5 | 3 | 3 | 3 |
| cation source | | | | | | | |
| potassium hydroxide | 2.0 | — | 2.0 | 3.3 | 2.0 | — | — |
| zinc acetate | — | 6.4 | — | — | — | — | — |
| aluminum hydroxide | — | — | — | — | — | 2.8 | — |
| ammonium hydroxide | — | — | — | — | — | — | 1.3 |
| plasticizer DOP[1)] | 100 | 100 | 100 | 100 | 100 | 100 | 100 |
| viscosity of plastisol | | | | | | | |
| initial (poise) | 178 | 193 | 217 | 812 | 244 | 175 | 371 |
| change with time (14/0) | 1.4 | 1.3 | 1.5 | 1.5 | 1.6 | 1.3 | 5.0 |
| physical properties of sheet | | | | | | | |
| tensile strength (kg/cm2) | 91 | 88 | 88 | 31 | 84 | 70 | 84 |
| elongation (%) | 260 | 260 | 240 | 450 | 300 | 190 | 260 |
| hardness (Shore-A) | 63 | 62 | 63 | 35 | 60 | 64 | 63 |
| bleeding resistance | ○ | ○ | ○ | ○ | ○ | Δ | ○ |
| resistance to whitening by water | ○ | ○ | ○ | ○ | ○ | ○ | Δ |

(Part 2)

| | | | | | |
|---|---|---|---|---|---|
| Example | — | — | — | — | — |
| Comparative Example | — | — | — | — | — |
| Reference Example | 1 | 2 | 3 | 4 | 5[2)] |
| monomer | | | | | |
| methyl methacrylate | 85 | 85 | 82 | 82 | 65 |
| ethyl acrylate | — | — | — | — | — |
| butadiene | 15 | — | 15 | — | 35 |
| isoprene | — | 15 | — | 15 | — |
| methacrylic acid | — | — | 3 | 3 | — |
| cation source | | | | | |
| potassium hydroxide | 3.0 | 3.0 | — | — | 3.0 |
| zinc acetate | — | — | — | — | — |
| aluminum hydroxide | — | — | — | — | — |
| ammonium hydroxide | — | — | — | — | — |
| plasticizer DOP[1)] | 100 | 100 | 100 | 100 | 130 |
| viscosity of plastisol | | | | | |
| initial (poise) | 170 | 209 | 168 | 196 | >$10^5$ |
| change with time (14/0) | >10 | >10 | 5.3 | 4.7 | solid |
| physical properties of sheet | | | | | |
| tensile strength (kg/cm2) | 85 | 79 | 83 | 81 | — |
| elongation (%) | 280 | 270 | 260 | 250 | — |

TABLE 2-continued

| | | | | | |
|---|---|---|---|---|---|
| hardness (Shore-A) | 61 | 62 | 62 | 64 | — |
| bleeding resistance | ○ | ○ | ○ | ○ | — |
| resistance to whitening by water | △ | △ | △ | △ | — |

[1] Di-2-ethylhexylphthalate
[2] Latex prepared by polymerization could not be spray dried and polymer powder was prepared by coagulation and drying.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the acrylic ester copolymer plastisol composition of the invention has excellent storage stability even when generally used inexpensive plasticizers are used, gives molded sheet showing no bleeding and generates no toxic gas on heating to a high temperature, on burning or in case of fire. Thus, the acrylic ester copolymer plastisol composition is commercially advantageous.

What is claimed is:

1. An acrylic ester copolymer plastisol composition comprising (A) copolymer particles comprising, as the major components thereof, (a) 98 to 50 weight % of an alkyl acrylate unit having an alkyl group 1 to 8 carbon atoms and/or an alkyl methacrylate unit having an alkyl group of 1 to 8 carbon atoms and (b) 2 to 50 weight % of a diene monomer unit and (B) a plasticizer.

2. An acrylic ester copolymer plastisol composition as claimed in claim 1 wherein the copolymer particles comprise (a) 95 to 70 weight % of an alkyl acrylate unit having an alkyl group of 1 to 8 carbon atoms and/or an alkyl methacrylate unit having an alkyl group of 1 to 8 carbon atoms and (b) 5 to 30 weight % of a diene monomer unit.

3. An acrylic ester copolymer plastisol composition as claimed in claim 1, wherein the amount of (B) the plasticizer is in the range from 40 to 250 weight parts per 100 weight parts of (A) the copolymer particles.

4. An acrylic ester copolymer plastisol composition as claimed in claim 1, wherein the amount of (B) the plasticizer is in the range from 60 to 120 weight parts per 100 weight parts of (A) the copolymer particles.

5. An acrylic ester copolymer plastisol composition as claimed in claim 1, wherein the plasticizer comprises a phthalic acid ester plasticizer.

6. An acrylic ester copolymer plastisol composition as claimed in claim 1, wherein the diene monomer unit is derived from butadiene or isoprene.

7. An acrylic ester copolymer plastisol composition comprising (A) copolymer particles comprising, as the major components thereof, (a) 98 to 50 weight % of an alkyl acrylate unit having an alkyl group of 1 to 8 carbon atoms and/or an alkyl methacrylate unit having an alkyl group of 1 to 8 carbon atoms and (b) 2 to 50 weight % of a diene monomer unit, (B) a plasticizer and (C) a vulcanizing agent.

8. An acrylic ester copolymer plastisol composition as claimed in claim 7 wherein the amount of (C) the vulcanizing agent is in the range from 0.5 to 5 weight parts per 100 weight parts of (A) the copolymer particles.

9. An acrylic ester copolymer plastisol composition as claimed in claim 7, wherein the amount of (B) the plasticizer is in the range from 40 to 250 weight parts per 100 weight parts of (A) the copolymer particles.

10. An acrylic ester copolymer plastisol composition as claimed in claim 7, wherein the amount of (B) the plasticizer is in the range from 60 to 120 weight parts per 100 weight parts of (A) the copolymer particles.

11. An acrylic ester copolymer plastisol composition as claimed in claim 7, wherein the plasticizer comprises a phthalic acid ester plasticizer.

12. An acrylic ester copolymer plastisol composition as claimed in claim 7, wherein the diene monomer unit is derived from butadiene or isoprene.

13. An acrylic ester copolymer plastisol composition comprising (A) copolymer particles comprising an ionic crosslinked copolymer prepared by ionic crosslinking of a copolymer comprising, as the major components thereof, (a) 97 to 50 weight % of an alkyl acrylate unit having an alkyl group of 1 to 8 carbon atoms and/or an alkyl methacrylate unit having an alkyl group of 1 to 8 carbon atoms, (b) 2 to 40 weight % of a diene monomer unit and (c) 1 to 20 weight % of a radical polymerizable unsaturated carboxylic acid unit of 3 to 8 carbon atoms having a carboxyl group and (B) a plasticizer, the ionic crosslinking being made through the carboxyl group in the copolymer by addition of a monovalent or divalent metal cation.

14. An acrylic ester copolymer plastisol composition as claimed in claim 13 wherein the copolymer comprises (a) 90 to 70 weight % of an alkyl acrylate unit having an alkyl group of 1 to 8 carbon atoms and/or an alkyl methacrylate unit having an alkyl group of 1 to 8 carbon atoms, (b) 5 to 30 weight % of a diene monomer unit and (c) 2 to 10 weight % of a radical polymerizable unsaturated carboxylic acid unit of 3 to 8 carbon atoms having a carboxyl group.

15. An acrylic ester copolymer plastisol composition as claimed in claim 13, wherein the amount of (B) the plasticizer is in the range from 40 to 250 weight parts per 100 weight parts of (A) the copolymer particles.

16. An acrylic ester copolymer plastisol composition as claimed in claim 13, wherein the amount of (B) the plasticizer is in the range from 60 to 120 weight parts per 100 weight parts of (A) the copolymer particles.

17. An acrylic ester copolymer plastisol composition as claimed in claim 13, wherein the plasticizer comprises a phthalic acid ester plasticizer.

18. An acrylic ester copolymer plastisol composition as claimed in claim 13, wherein the diene monomer unit is derived from butadiene or isoprene.

* * * * *